(12) United States Patent
Feng

(10) Patent No.: US 11,361,681 B2
(45) Date of Patent: Jun. 14, 2022

(54) DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Zikang Feng, Hubei (CN)

(73) Assignee: WUHAN CHINA STAR OPTOELECTRONICS SEMICONDUCTOR DISPLAY TECHNOLOGY CO., LTD., Hubei (CN)

(*) Notice: Subject to any disclaimer, the term of this patent is extended or adjusted under 35 U.S.C. 154(b) by 274 days.

(21) Appl. No.: 16/621,317

(22) PCT Filed: Sep. 20, 2019

(86) PCT No.: PCT/CN2019/107080
§ 371 (c)(1),
(2) Date: Dec. 11, 2019

(87) PCT Pub. No.: WO2020/224163
PCT Pub. Date: Nov. 12, 2020

(65) Prior Publication Data
US 2021/0366318 A1 Nov. 25, 2021

(30) Foreign Application Priority Data
May 6, 2019 (CN) .......................... 201910372237.5

(51) Int. Cl.
*G09F 9/00* (2006.01)
*G09F 9/30* (2006.01)
*G06F 1/16* (2006.01)

(52) U.S. Cl.
CPC ............ *G09F 9/301* (2013.01); *G06F 1/1624* (2013.01); *G06F 1/1652* (2013.01)

(58) Field of Classification Search
CPC ....... G09F 9/301; G06F 1/1624; G06F 1/1652
See application file for complete search history.

(56) References Cited

U.S. PATENT DOCUMENTS

| | | | |
|---|---|---|---|
| 9,678,539 B2* | 6/2017 | Hayk | G06F 1/1652 |
| 2016/0100478 A1* | 4/2016 | Lee | G06F 1/1626 |
| | | | 361/749 |
| 2017/0060183 A1* | 3/2017 | Zhang | G06F 1/1605 |
| 2018/0077808 A1* | 3/2018 | Seo | G06F 1/1652 |
| 2018/0329514 A1* | 11/2018 | Kwon | G06F 1/1652 |

OTHER PUBLICATIONS

CN 206301242 U; English Translation (Year: 2016).*

* cited by examiner

*Primary Examiner* — Pete T Lee

(57) ABSTRACT

The invention provides a display device including a flexible display screen and a support base. The support base has a support surface, and the flexible display screen is positioned on the support surface. The support base includes a first support and a second support, and the first support and the second support slidable relative to each other along a first direction. A first end of the flexible display screen is coupled to the first support, a second end of the flexible display screen is coupled to the second support, and the first support and the second support are provided with a winding mechanism for winding the flexible display screen.

12 Claims, 7 Drawing Sheets

DISPLAY DEVICE

FIELD OF INVENTION

The present invention relates to the field of display technology, and in particular, to a display device.

BACKGROUND OF INVENTION

Organic light-emitting diodes (OLEDs) attracts extensive attention for their bendability and flexibility. As shown in FIG. 1, a flexible OLED display device is in a rolled-up state, and as shown in FIG. 2, the flexible OLED display device is in a use state. By rolling up the flexible OLED display device, space for a large-sized flexible screen body 10 can be reduced, making it more portable. Base on this reason, a major research direction for the flexible OLED is curlable display device.

However, because flexible screen body 10 is relatively soft, when using the flexible OLED display device in hand, it is inconvenient to perform a touch operation on the flexible screen body.

TECHNICAL PROBLEM

Since a flexible screen body 10 is relatively soft, when using a flexible OLED display device in hand, it is inconvenient to perform a touch operation on the flexible screen body.

SUMMARY OF INVENTION

A display device, the display device includes a flexible display screen including a first end and a second end opposite to the first end; a support base, wherein an outer surface of the support base includes a support surface, the flexible display screen is positioned on the support surface, and the support base includes a first support and a second support, the first support and the second support slide relative to each other along a first direction to increase or decrease an area of the support surface; wherein the first end of the flexible display screen is coupled to the first support, the second end of the flexible display screen is coupled to the second support, the first support or/and the second support are provided with a winding mechanism for winding the flexible display screen, and wherein the winding mechanism winds the flexible display screen or releases a part of the flexible display screen that is wound when the first support and the second support slide relative to each other.

Further, the winding mechanism is provided with one, the winding mechanism is fixed to the first support, and the first end of the flexible display screen is coupled to the winding mechanism; alternatively, the winding mechanism is fixed to the second support, and the second end of the flexible display screen is coupled to the winding mechanism.

Further, the winding mechanism is provided with two, one winding mechanism is disposed on the first support, and the other winding mechanism is disposed on the second support; the first end of the flexible display screen is coupled to one winding mechanism, and the second end of the flexible display screen is coupled to the other winding mechanism.

Further, a flexible support plate is disposed between the flexible display screen and the support base, the first end of the flexible display screen is fixedly coupled to one end of the flexible support plate, and the second end of the flexible display screen is fixedly coupled to the other end of the flexible support plate.

Further, the flexible display screen is attached and fixed to the flexible support plate.

Further, the winding mechanism includes a coil spring, the coil spring has an axis parallel to the support surface and perpendicular to the first direction, an inner end of the coil spring is fixedly coupled to the support base, an outer end of the coil spring is fixedly coupled to an end of the flexible support plate, and wherein when the first support and the second support move relative to each other, the coil spring provides a pulling force to keep the flexible support plate attached to the support surface.

Further, the first support includes a first connecting part and a first sliding part fixedly coupled to the first connecting part, the second support includes a second connecting part and a second sliding part fixedly coupled to the second connecting part; the first connecting part is disposed opposite to the second connecting part, and the first sliding part and the second sliding part are slidably coupled to each other along a first direction, and a support surface formed by an outer surface of the first sliding part and an outer surface of the second sliding part is a plane.

Further, the first sliding part and the second sliding part are comb-toothed and engaged with each other.

Further, one of the first sliding part and the second sliding part is a comb-tooth structure, the other is a plate-like structure, a bump positioned at a gap of the comb-tooth structure is fixedly disposed on the plate-like structure, the bump and the comb-tooth structure is slidably coupled to each other along a first direction.

Further, a longitudinal cross-section of the support base is entirely annular, and longitudinal cross-sections of the first support and the second support are entirely U-shaped.

Further, the first support further includes a third sliding part disposed opposite to the first sliding part and fixedly coupled to the first connecting part, the second support further includes a fourth sliding part disposed opposite to the second sliding part and fixedly coupled to the second connecting part, the third sliding part and the fourth sliding part are slidably coupled to each other along a first direction.

Further, a cavity is disposed in the support base, the winding mechanism is positioned in the cavity of the support base, an opening for connecting the flexible display screen and the winding mechanism is disposed on the first connecting part or/and the second connecting part which are adjacent to the winding mechanism.

Further, the opening is positioned on a side of the support base away from the first sliding part.

Further, a pulley is disposed at an end of the support base, an axis of the pulley is parallel to an axis of the coil spring, the pulley is rotatably coupled to the support base around its axial direction, and the flexible display screen bypasses the pulley and abuts the pulley.

BENEFICIAL EFFECT

The display device has two states. When a first support or a second support slides along a first direction to reduce an area of a support surface, a display screen of a display device on the support surface becomes smaller; at this time, the display device is in a state of being convenient to carry. When a first support or a second support slides along a first direction to enlarge an area of a support surface, a display screen of a display device on the support surface becomes larger; at this time, the display device is in a functional state. Utilizing a support function of a support base and a flexible support plate, an unevenness feeling of a flexible display screen is reduced, and it is more convenient to operate when performing a touch operation on a flexible screen.

DESCRIPTION OF DRAWINGS

In order to more clearly illustrate the technical solutions in the embodiments of the present invention, the following figures described in the embodiments will be briefly introduced. It is obvious that the drawings described below are merely some embodiments of the present invention, other drawings can also be obtained by the person ordinary skilled in the field based on these drawings without doing any creative activity.

REFERENCE NUMERALS

Figure 1:
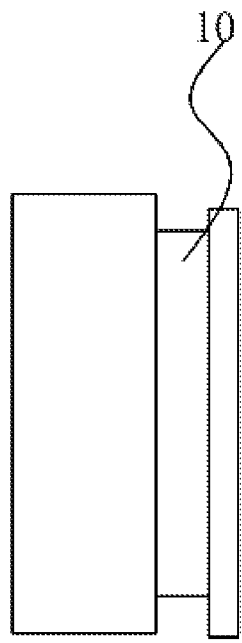
FIG. 1 is a schematic view of a flexible OLED display device in a rolled-up state described in the background of the present invention.
Figure 2:
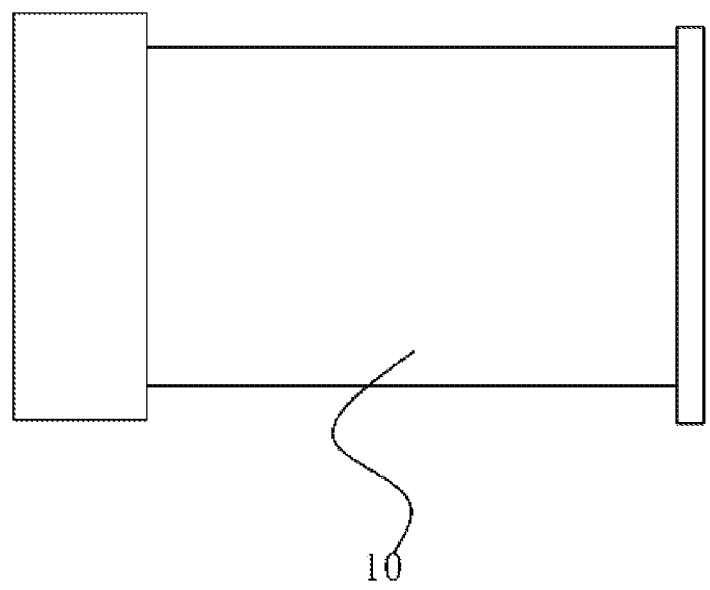
FIG. 2 is a schematic diagram of a flexible OLED display device in an operation state described in the background of the present invention.

10: flexible screen body; 20: flexible display screen; 21: first end; 22: second end; 30: support base; 31: first support; 311: first connecting part; 312: first sliding part; 313: third sliding part; 32: second support; 321: second connecting part; 322: second sliding part; 323: fourth sliding part; 33: supporting surface; 34: cavity; 40: flexible support plate; 50: winding mechanism; 51: coil spring; 52: rotating shaft; 60: support shaft; 71: gap; 72: bump; 80: pulley; 90: opening; 101: indicator line; 102: fixed block.

DETAILED DESCRIPTION OF PREFERRED EMBODIMENTS

The following description of the embodiments is provided to illustrate the specific embodiments of the invention. Directional terminology mentioned in the application, such as "above", "under", "front", "back", "left", "right", "inside", "outside", "side", etc., are only refer to the directions of the accompanying drawings. Therefore, the directional terminology used is for illustrating and understanding the application and is not intended to limit the application. In the figures, structurally similar elements are denoted by the same reference numerals.

The present invention is directed to the technical problem that when the flexible OLED display device is used in hand, it is inconvenient to perform a touch operation on the flexible screen because the flexible screen body is relatively soft. The present invention can solve the problem.

Embodiment 1

Figure 3:
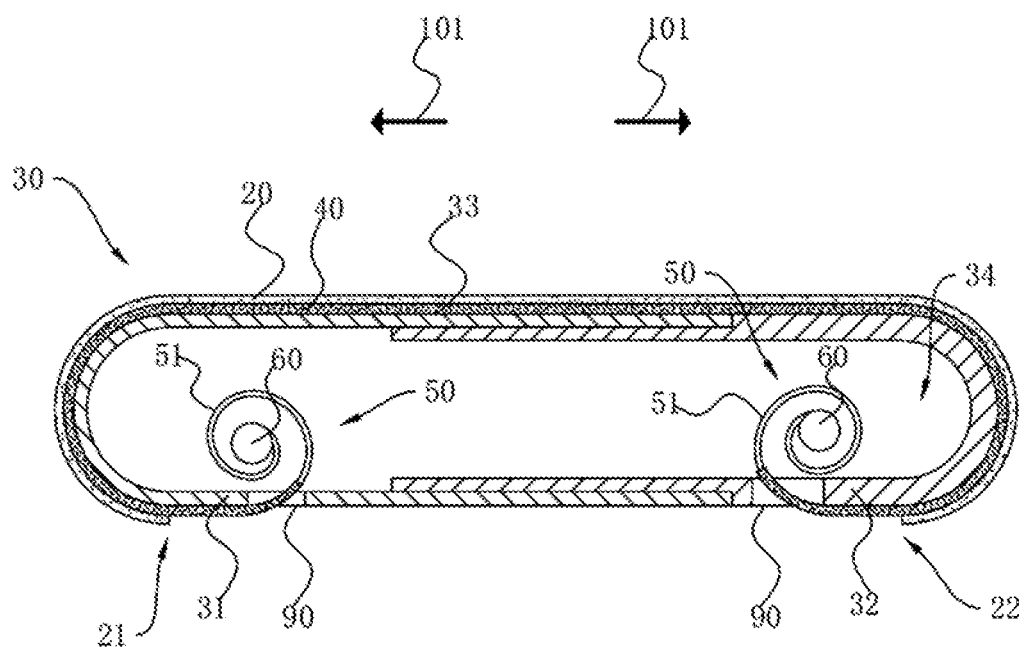
FIG. 3 is a schematic structural diagram of a display device according to Embodiment 1 of the present invention.

A display device, as shown in FIG. 3, includes a flexible display screen 20 and a support base 30.

The flexible display screen 20 includes a first end 21 and a second end 22 disposed opposite to the first end 21; the support base 30 includes a first support 31 and a second support 32, and an outer surface of the support base 30 includes a support surface 33. The first support 31 and the second support 32 are used to slide relative to each other along a first direction to increase or decrease an area of the support surface 33.

Specifically, the flexible display screen 20 is positioned on the support surface 33, and two ends of the flexible display screen 20 bypass two ends of the support base 30 to extend to a backside of the support base 30. It should be noted that a direction indicated by an indicator line 101 as shown in FIG. 3 is the first direction.

Specifically, a first end 21 of the flexible display screen 20 is coupled to the first support 31, a second end 22 of the flexible display screen 20 is coupled to the second support 32. The first support 31 or/and the second support 32 are provided with a winding mechanism 50 for winding the flexible display screen 20. When the first support 31 and the second support 32 slides relative to each other, the winding mechanism 50 winds the flexible display screen 20 or the winding mechanism 50 releases a portion of the flexible display screen 20 to be wound.

When holding a display device and performing touch operation on a flexible screen, flexible display screen 20 is supported by support surface 33 of support base 30. It is not only more convenient to operate but also preventing the flexible display screen 20 from being greatly depressed when the flexible display screen 20 is touched.

When first support 31 or second support 32 slides along the first direction to reduce an area of support surface 33, an "excess" portion of the flexible display screen 20 is wound and accommodated by winding mechanism 50, making a portion of the flexible display screen 20 on the support surface 33 in a flat state. At this time, the display device has a small volume, which is convenient for carrying and storing. When first support 31 or second support 32 slides along the first direction to enlarge an area of support surface 33, winding mechanism 50 releases a portion of the flexible display screen 20 that is accommodated. At this time, a display area of a display device on support surface 33 is larger and can be used as a functional state of the display device.

Specifically, a flexible support plate 40 is disposed between the flexible display screen 20 and the support base 30, a first end 21 of the flexible display screen 20 is fixedly coupled to one end of the flexible support plate 40, and a second end 22 of the flexible display screen 20 is fixedly coupled to the other end of the flexible support plate 40.

Further, the flexible display screen 20 is attached and fixed to the flexible support plate 40.

Further, the flexible support plate 40 is a metal piece and has a thickness of 5 to 35 microns.

By providing a flexible support plate 40 at a lower portion of a flexible display screen 20, a pulling force of the winding mechanism 50 can be applied to the flexible support plate 40, preventing the flexible display screen 20 from being stretched under long-term tension, while a support effect of the flexible support plate 40 is utilized to reduce a feeling of touch unevenness when performing a touch operation on the flexible display screen 20.

Specifically, the winding mechanism 50 includes a coil spring 51, the coil spring 51 has an axis parallel to the support surface 33 and perpendicular to the first direction, an inner end of the coil spring 51 is fixedly coupled to the support base 30, an outer end of the coil spring 51 is fixedly coupled to an end of the flexible support plate 40, and wherein when the first support 31 and the second support 32 move relative to each other, the coil spring 51 provides a pulling force to keep the flexible support plate 40 attached to the support surface 33.

In one embodiment, the winding mechanism 50 is provided with two, one winding mechanism 50 is disposed on the first support 31, and the other winding mechanism 50 is disposed on the second support 32; a first end 21 of the flexible display screen 20 is coupled to one winding mechanism 50, and a second end 22 of the flexible display screen 20 is coupled to the other winding mechanism 50.

Further, an inner end of the coil spring 51 positioned on the first support 31 is fixedly coupled to the first support 31, an outer end of the coil spring 51 positioned on the first support 31 is fixedly coupled to one end of the flexible support plate 40, an inner end of the coil spring 51 positioned on the second support 32 is fixedly coupled to the second support 32, an outer end of the coil spring 51 positioned on the second support 32 is fixedly coupled to the other end of the flexible support plate 40.

Further, a support shaft 60 is fixedly disposed on the first support 31 and the second support 32, the coil spring 51 is sleeved on the support shaft 60, an inner end of the coil spring 51 is fixedly coupled to the corresponding support shaft 60 such that the inner end of the coil spring 51 is fixedly coupled to the support base 30.

It can be known to those skilled in the art that when coil spring 51 is compressed, it has a tendency to return to a natural tensile state. By utilizing the elastic potential energy of the compressed coil spring 51, when first support 31 and second support 32 slide along the first direction to reduce an area of support surface 33, a restoring force of the coil spring 51 wind and accommodates an "excess" portion of the flexible display screen 20; when first support 31 and second support 32 slide along the first direction to enlarge an area of the support surface 33, the coil spring 51 is pulled by the external tension to release a portion of the flexible display screen 20 that is wound and accommodated. The flexible support plate 40 is always kept in close contact with the support surface 33 during the sliding process of the first support 31 and the second support 32 under the pulling force provided by the coil spring 51. This presents a visual sense of screen floating when a user sees the flexible display screen.

Specifically, a cavity 34 is disposed in the support base 30, the winding mechanism 50 is positioned in the cavity 34 of the support base 30, an opening 90 for connecting the flexible display screen 20 to the winding mechanism 50 is disposed on the support base 30 adjacent to the winding mechanism 50. That is, an end of the flexible support plate 40 is fixedly coupled to an outer end of the coil spring 51 through the opening 90.

Specifically, a longitudinal cross-section of the support base 30 is entirely annular, and longitudinal cross-sections of the first support 3 land the second support 32 are entirely U-shaped to facilitate the hand-held operation of the display device. In addition, facilitating the sliding of the flexible support plate 40 at both ends of the support base 30, and reducing friction between the flexible support plate 40 and the support base 30.

Embodiment 2

Figure 4:
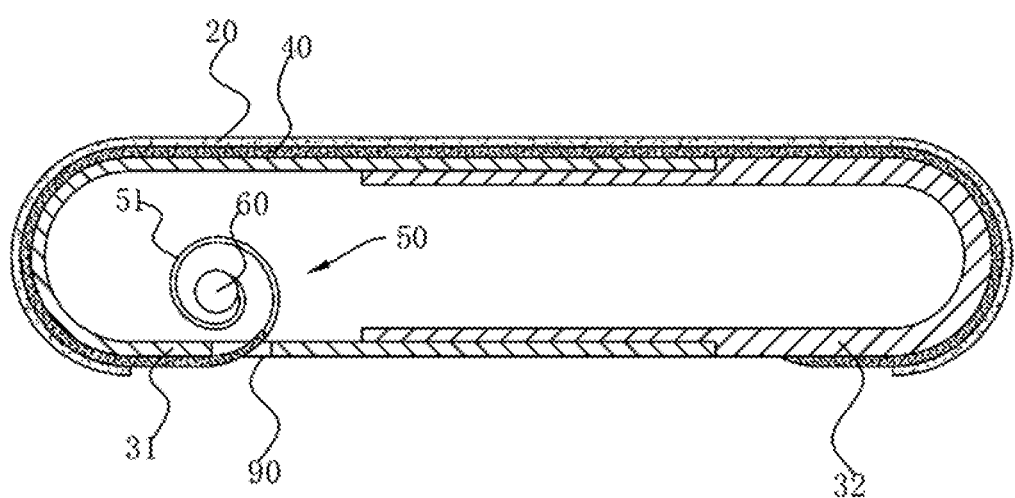
FIG. 4 is a schematic structural diagram of a display device according to Embodiment 2 of the present invention.

A display device, as shown in FIG. 4, the difference from the embodiment 1 is that only one winding mechanism 50 is provided. Specifically, the winding mechanism 50 is fixed to the first support 31, and a first end 21 of the flexible display screen 20 is coupled to the winding mechanism 50.

Further, an inner end of the coil spring 51 is fixedly coupled to the first support 31, an outer end of the coil spring 51 is fixedly coupled to one end of the flexible support plate 40, and the other end of the flexible support plate 40 is fixedly coupled to the second support 32.

Further, a support shaft 60 is fixedly disposed on the first support 31, the coil spring 51 is sleeved on the support shaft 60, and an inner end of the coil spring 51 is fixedly coupled to the support shaft 60.

Embodiment 3

Figure 5:
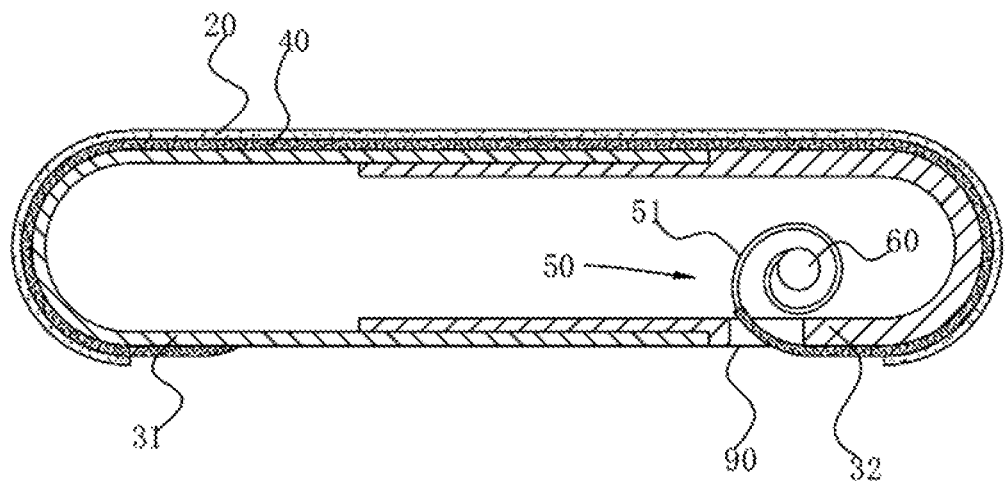
FIG. 5 is a schematic structural diagram of a display device according to Embodiment 3 of the present invention.

A display device, as shown in FIG. 5, the difference from the embodiment 1 is that only one coil spring 51 is provided.

Specifically, the winding mechanism 50 is fixed to the second support 32, and a second end 21 of the flexible display screen 20 is coupled to the winding mechanism 50.

Further, an inner end of the coil spring 51 is fixedly coupled to the second support 32, an outer end of the coil spring 51 is fixedly coupled to one end of the flexible support plate 40, and the other end of the flexible support plate 40 is fixedly coupled to the first support 31.

Further, the second support 32 is fixedly provided with a support shaft 60, the coil spring 51 is sleeved on the support shaft 60, and an inner end of the coil spring 51 is fixedly coupled to the support shaft 60.

Embodiment 4

Figure 6:
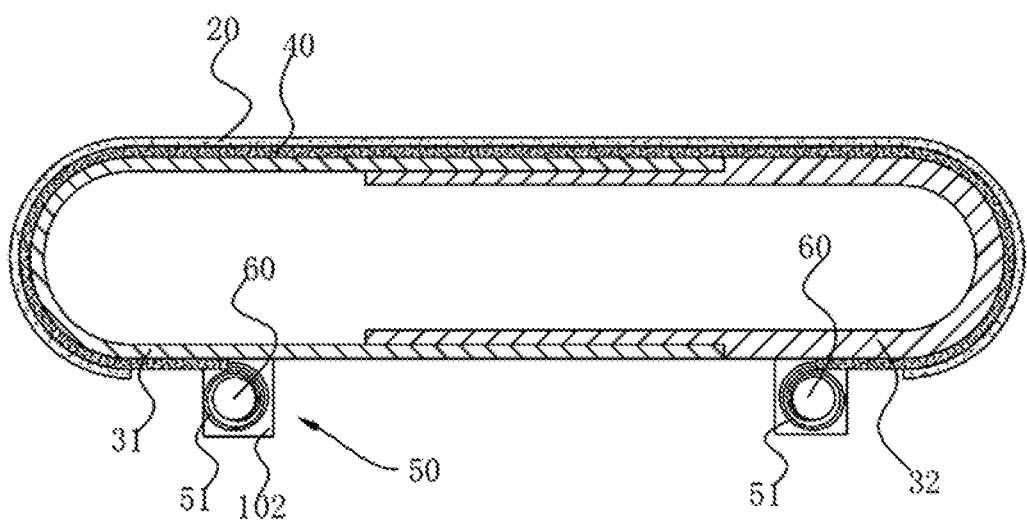
FIG. 6 is a schematic structural diagram of a display device according to Embodiment 4 of the present invention.

A display device, as shown in FIG. 6, the difference from the embodiment 1 is that the support shaft 60 and the coil spring 51 are disposed outside the support base 30.

The support shaft 60 is rotatably coupled to the support base 30 around its axial direction. The coil spring 51 is sleeved on the support shaft 60, an inner end of the coil spring 51 is fixedly coupled to the support shaft 60, and an outer end of the coil spring 51 is fixedly coupled to one end of the flexible support plate 40.

In one embodiment, the support base 30 is fixed with a fixing block 102, the support shaft 60 is rotatably coupled to the fixed block 102 around its axial direction, and thereby a rotational connection of the support shaft 60 to the support base 30 is achieved.

Embodiment 5

Figure 7:
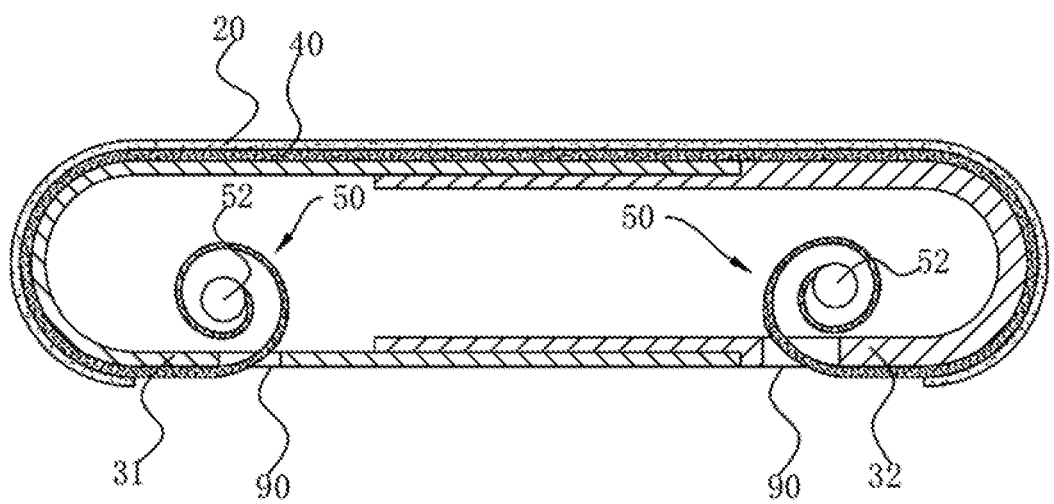
FIG. 7 is a schematic structural diagram of a display device according to Embodiment 5 of the present invention.

A display device, as shown in FIG. 7, the difference from the embodiment 1 is that a structure of the winding mechanism 50 is different.

Specifically, the winding mechanism 50 includes a rotating shaft 52, an axis of the rotating shaft 52 is parallel to the support surface 33 and perpendicular to the first direction. The rotating shaft 52 is rotatably coupled to the support base 30 around its axial direction, and an end of the flexible support plate 40 is fixedly coupled to the rotating shaft 52. When the first support 31 and the second support 32 slides relative to each other along a first direction, a flexible display screen is wound or a portion of the flexible display screen that is wound is released by manually rotating the support base 30.

It should be noted that FIG. 7 only illustrates a case where two rotating shafts 52 are provided, and the two rotating shafts 52 are respectively positioned on a first support 31 and a second support 32. In actual practice, it is also possible to provide a rotating shaft 52 only on the first support 31 or the second support 32. When rotating shaft 52 is positioned on first support 31, one end of a flexible supporting plate 40 is fixedly coupled to the rotating shaft 52, and the other end of the flexible supporting plate 40 is fixedly coupled to the second support 32. When rotating shaft 52 is positioned on the second support 32, one end of the flexible supporting plate 40 is fixedly coupled to the rotating shaft 52, and the other end of the flexible supporting plate 40 is fixedly coupled to the first support 31.

It should be noted that FIG. 7 only illustrates a case where rotating shaft 52 is disposed in the support base 30. In the case, at least one end of the rotating shaft 52 penetrates a sidewall of the support base 30 to extend the support base 30. In actual practice, the rotating shaft 52 may also be disposed on an outer side of the support base 30.

Embodiment 6

Figure 8:
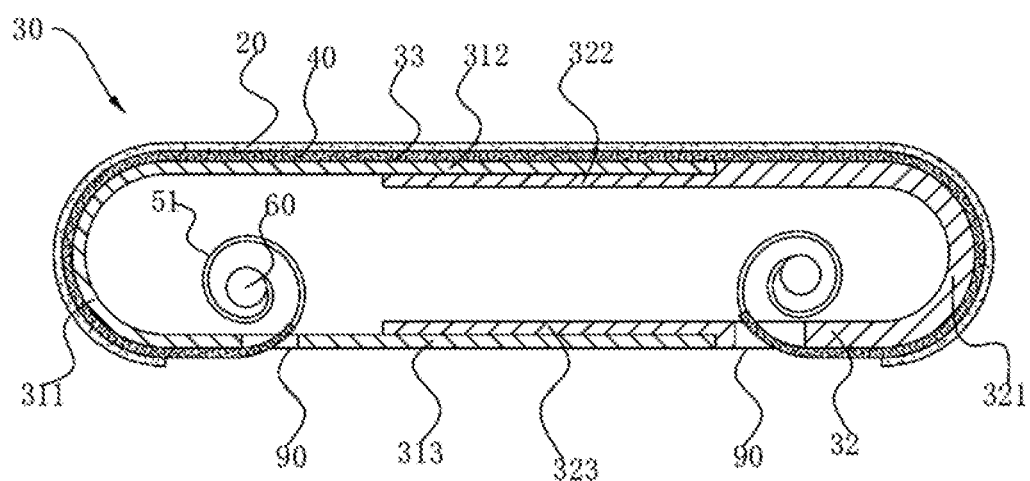
FIG. 8 is a schematic structural diagram of a display device according to Embodiment 6 of the present invention.
Figure 9:
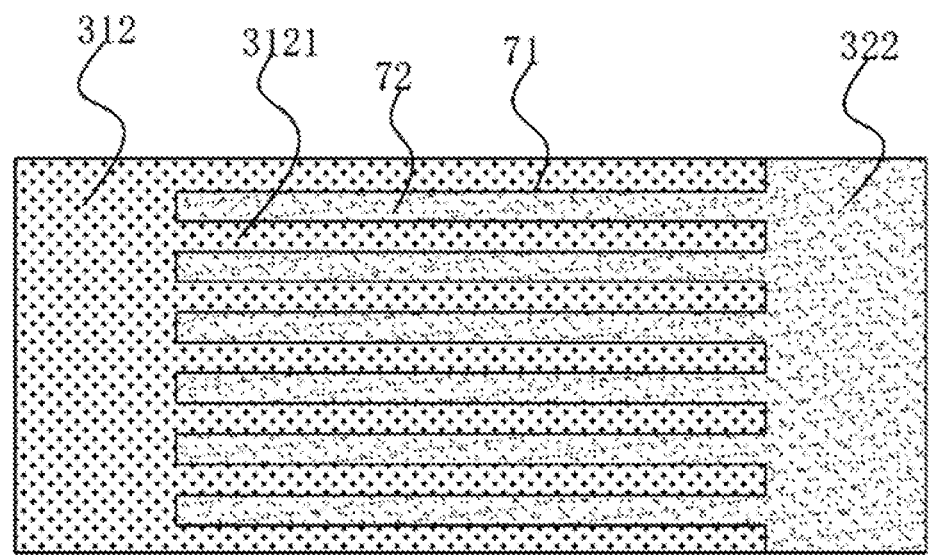
FIG. 9 is a schematic view of a support surface on the support base of the present invention.

A display device, as shown in FIG. 8 and FIG. 9, the difference from the embodiment 1 is that the first support 31 includes a first connecting part 311 and a first sliding part 312 fixedly coupled to the first connecting part 311; the second support 32 includes a second connecting part 321 and a second sliding part 322 fixedly coupled to the second connecting part 321; the first connecting part 311 is provided opposite to the second connecting part 321, the first sliding part 312 and the second sliding part 322 are slidably coupled to each other along the first direction. A support surface 33 formed by an outer surface of the first sliding part 312 and an outer surface of the second sliding part 322 is a plane.

In one embodiment, one of the first sliding part 312 and the second sliding part 322 is a comb-tooth structure, the other one is a plate-like structure. The plate-like structure is fixedly provided with a bump 72 positioned at a gap of the comb-tooth structure, and the bump 72 and the comb-tooth structure is slidably coupled to each other along a first direction.

Further, the first sliding part 312 is a comb-tooth structure, and the second sliding part 322 is a plate-like structure. A bottom surface of the first sliding part 312 is in contact with a top surface of the second sliding part.

Further, the first sliding part 312 includes a plurality of first sliders 3121 arranged in intervals along an axial direction of the coil spring 51. A number and sizes of the bumps 72 matches that of the gap 71 between the adjacent first sliders 3121, the first slider 3121 and the bump 72 are staggered with each other such that the first sliding part 312 and the second sliding part 72 are engaged with each other.

Further, the first sliding part 312 includes a plurality of first sliders 3121 arranged in intervals along an axial direction of the coil spring 51. A number and sizes of the bumps 72 matches that of the gap 71 between the adjacent first sliders 3121. The first slider 3121 and the bump 72 are staggered with each other such that the first sliding part 312 and the second sliding part 72 are engaged with each other.

When an area of the support surface 33 is minimized, the display device is in a state of being portable. By tight "engaging" of a first sliding part 312 and a bump 72 to form a flat supporting surface 33, providing flat support for a flexible display screen 20. When the first support 31 and the second support 32 slides relative to each other to increase an area of the support surface 33, a cooperation of the first sliding part 312 and the bump 72 limits a sliding trajectory of the first support 31 and the second support 32. Since the first sliding part 312 and the bump 72 are not in a tight "engaging" state at this time, a feeling of touch unevenness when performing touch operation on the flexible display screen 20 can be reduced by the supporting action of the flexible support plate 40.

Further, the numbers of the first slider 3121 and the bump 72 are both greater than 10. In addition, a spacing between adjacent first sliders 3121 and a spacing between adjacent bumps 72 are less than 5 mm.

It should be noted, as known by those skilled in the art. The more numbers of the first sliders 3121 and the bumps 72 and the smaller spacings between the adjacent first sliders 312 land between the adjacent bumps 72, resulting in smaller gaps on the support surface 33 when a first support 31 and a second support 32 relatively slide to increase an area of the support surface 33. A feeling of touch unevenness when performing touch operation on the flexible display screen 20 is therefore reduced. In a specific implementation, the number and spacing of first slider 3121 and bump 72 can be selected according to a width of the support surface 33. The larger the width of the support surface 33, the greater the number of the first sliders 3121 and the bumps 72, resulting in the spacings between adjacent first sliders 3121 and between adjacent bumps 72 are smaller.

In another embodiment, the first sliding part 312 and the second sliding part 322 are comb-toothed shape and are engaged with each other.

Figure 10:
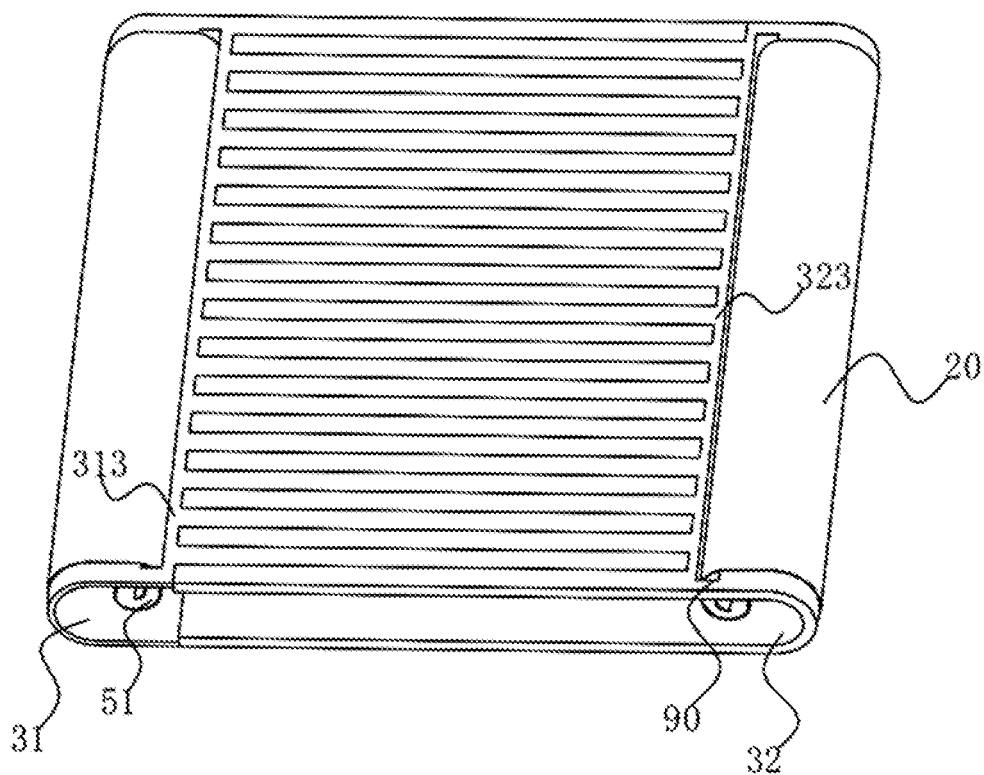
FIG. 10 is a schematic view of a side of the support base away from a first sliding part and a second sliding part.

As shown in FIG. 8 and FIG. 10, FIG. 10 is a schematic view of a side of a support base 30 away from the first sliding part 312 and the second sliding part 322.

Specifically, the first support 31 further includes a third sliding part 313 disposed opposite to the first sliding part 312 and fixedly coupled to the first connecting part 311. The second support 32 further includes a fourth sliding part 323 disposed opposite to the second sliding part 322 and fixedly coupled to the second connecting part 321. The third sliding part 313 and the fourth sliding part 323 are slidably coupled to each other along the first direction.

In one embodiment, the first connecting part 311 is integrally formed with the first sliding part 312 and the third sliding part 313. The second connecting part 321 is integrally formed with the fourth sliding part 323 and the second sliding part 322.

In one embodiment, an overall structure of the third sliding part 313 is the same as an overall structure of the first sliding part 312. An overall structure of the fourth sliding part 323 is the same as an overall structure of the second sliding part 322.

Further, a top surface of the third sliding part 313 is in contact with the four sliding part 323.

Specifically, an opening 90 is positioned on the first connecting part 311 or/and the second connecting part 321 near the coil spring 51.

Further, the opening 90 is positioned on a side of the support base 30 away from the first sliding part 312.

Figure 11:
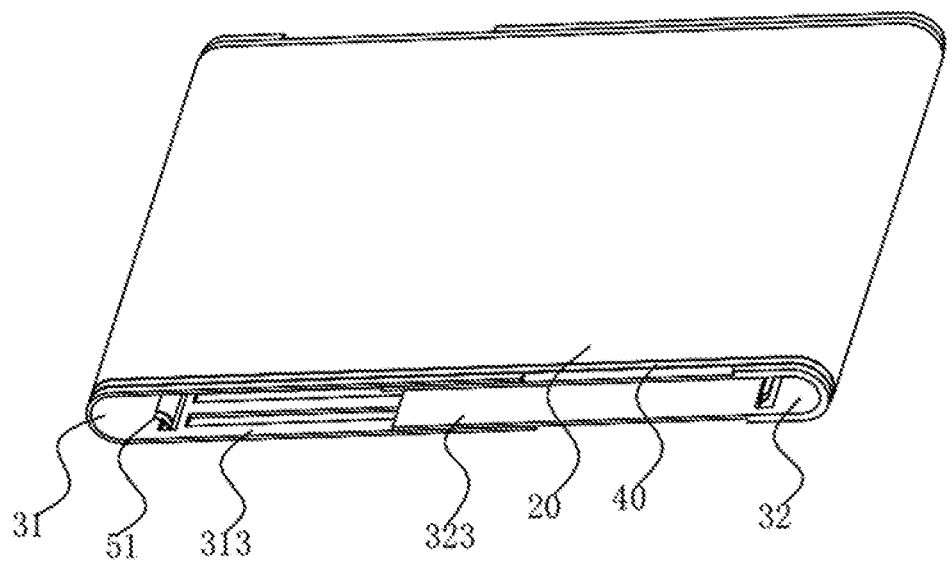
FIG. 11 is a schematic structural view of a display device in a functional state according to the present invention.
Figure 12:
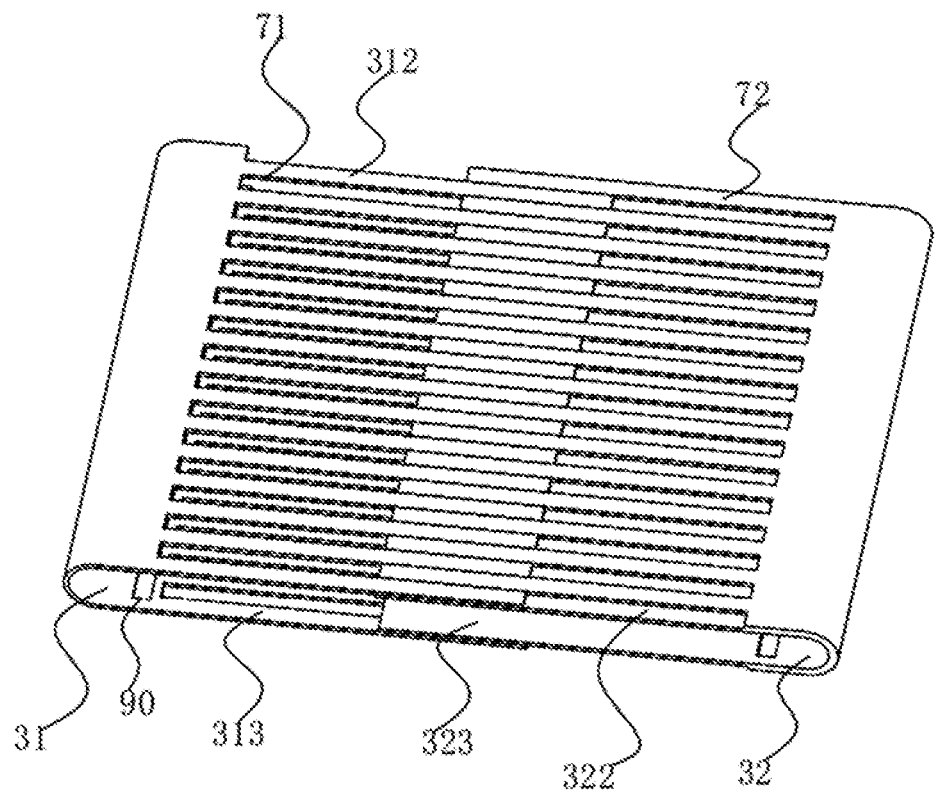
FIG. 12 is a schematic structural view of a support base when a display device is in a functional state according to the present invention.

As shown in FIG. 11 and FIG. 12, when a first support 31 and a second support 32 slides relative to each other to increase an area of the support surface 33, a display area of a flexible display screen 20 also increases, and the display device is in a functional state.

Embodiment 7

Figure 13:
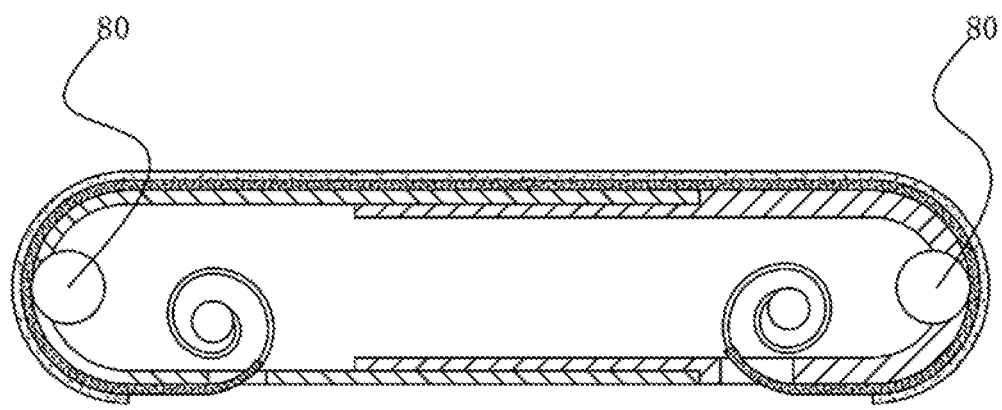
FIG. 13 is a schematic structural diagram of a display device according to Embodiment 7 of the present invention.

A display device, as shown in FIG. 13, the different from the embodiment 6 in that a pulley 80 is disposed at an end of the support base 30. An axis of the pulley 80 is parallel to an axis of the coil spring 51. The pulley 80 is rotatably coupled to the support base 30 around its axial direction. The flexible display screen 20 bypasses the pulley 80 and abuts the pulley 80, and the flexible support plate 40 bypasses the pulley 80 and contacts with the pulley 80.

Further, both ends of the support base 30 are provided with pulleys 80. The pulley 80 is used to make a movement of flexible support plate 40 at an end of the support base 30 smoother while the damage of the flexible display screen 20 due to sliding friction is reduced.

The beneficial effects of the invention are: The display device has two states. When a first support 31 or a second support 32 slides along a first direction to reduce an area of a support surface 33, a display screen of a display device on the support surface 33 becomes smaller; at this time, the display device is in a state of being convenient to carry. When a first support 31 or a second support 32 slides along a first direction to enlarge an area of a support surface 33, a display screen of a display device on the support surface 33 becomes larger; at this time, the display device is in a functional state. Utilizing a support function of a support base 30 and a flexible support plate 40, a feeling of touch unevenness of a flexible display screen is reduced and it is more convenient to use when performing a touch on a flexible screen 20.

The description of the above exemplary embodiments is only for the purpose of understanding the invention. It is to be understood that the present invention is not limited to the disclosed exemplary embodiments. It is obvious to those skilled in the art that the above exemplary embodiments may be modified without departing from the scope and spirit of the present invention.

What is claimed is:

1. A display device, comprising:
   a flexible display screen comprising a first end and a second end opposite to the first end;
   a support base, wherein an outer surface of the support base comprises a support surface, the flexible display screen is positioned on the support surface, and the support base comprises a first support and a second support, and wherein the first support and the second support are slidable relative to each other along a first direction to increase or decrease an area of the support surface;
   a flexible support plate disposed between the flexible display screen and the support base, wherein the first end of the flexible display screen is coupled to one end of the flexible support plate, and the second end of the flexible display screen is coupled to another end of the flexible support plate;
   wherein the first support or/and the second support are provided with a winding mechanism for winding the flexible display screen, wherein the winding mechanism comprises a coil spring, the coil spring has an axis parallel to the support surface and perpendicular to the first direction, an inner end of the coil spring is fixedly coupled to the support base, and an outer end of the coil spring is fixedly coupled to the flexible support plate; and
   wherein when the first support and the second support slide relative to each other, the winding mechanism winds the flexible display screen or releases a part of the flexible display screen that is wound and the coil spring provides a pulling force to keep the flexible support plate attached to the support surface.

2. The display device according to claim 1, wherein the winding mechanism is provided with one, the winding mechanism is fixed to the first support, and the first end of the flexible display screen is coupled to the winding mechanism; alternatively, the winding mechanism is fixed to the second support, and the second end of the flexible display screen is coupled to the winding mechanism.

3. The display device according to claim 1, wherein the winding mechanism is provided with two, one winding mechanism is disposed on the first support, and the other winding mechanism is disposed on the second support; the first end of the flexible display screen is coupled to one winding mechanism, and the second end of the flexible display screen is coupled to the other winding mechanism.

4. The display device according to claim 1, wherein the flexible display screen is attached and fixed to the flexible support plate.

5. The display device according to claim 1, wherein the first support comprises a first connecting part and a first sliding part fixedly coupled to the first connecting part, the second support comprises a second connecting part and a second sliding part fixedly coupled to the second connecting part; the first connecting part is disposed opposite to the second connecting part, and the first sliding part and the second sliding part are slidably coupled to each other along a first direction, and a support surface formed by an outer surface of the first sliding part and an outer surface of the second sliding part is a plane.

6. The display device according to claim 5, wherein the first sliding part and the second sliding part are comb-toothed shape and engaged with each other.

7. The display device according to claim 5, wherein one of the first sliding part and the second sliding part is a comb-tooth structure, the other is a plate-like structure, a bump positioned at a gap of the comb-tooth structure is fixedly disposed on the plate-like structure, the bump and the comb-tooth structure is slidably coupled to each other along a first direction.

8. The display device according to claim 5, wherein a longitudinal cross-section of the support base is entirely annular, and longitudinal cross-sections of the first support and the second support are entirely U-shaped.

9. The display device according to claim 8, wherein the first support further comprises a third sliding part disposed opposite to the first sliding part and fixedly coupled to the first connecting part, the second support further comprises a fourth sliding part disposed opposite to the second sliding part and fixedly coupled to the second connecting part, the third sliding part and the fourth sliding part are slidably coupled to each other along a first direction.

10. The display device according to claim 5, wherein a cavity is disposed in the support base, the winding mechanism is positioned in the cavity of the support base, an opening for connecting the flexible display screen and the winding mechanism is disposed on the first connecting part or/and the second connecting part which are adjacent to the winding mechanism.

11. The display device according to claim 10, wherein the opening is positioned on a side of the support base away from the first sliding part.

12. The display device according to claim 11, wherein a pulley is disposed at an end of the support base, an axis of the pulley is parallel to an axis of the coil spring, the pulley is rotatably coupled to the support base around its axial direction, and the flexible display screen bypasses the pulley and abuts the pulley.

\* \* \* \* \*